Figure 1:
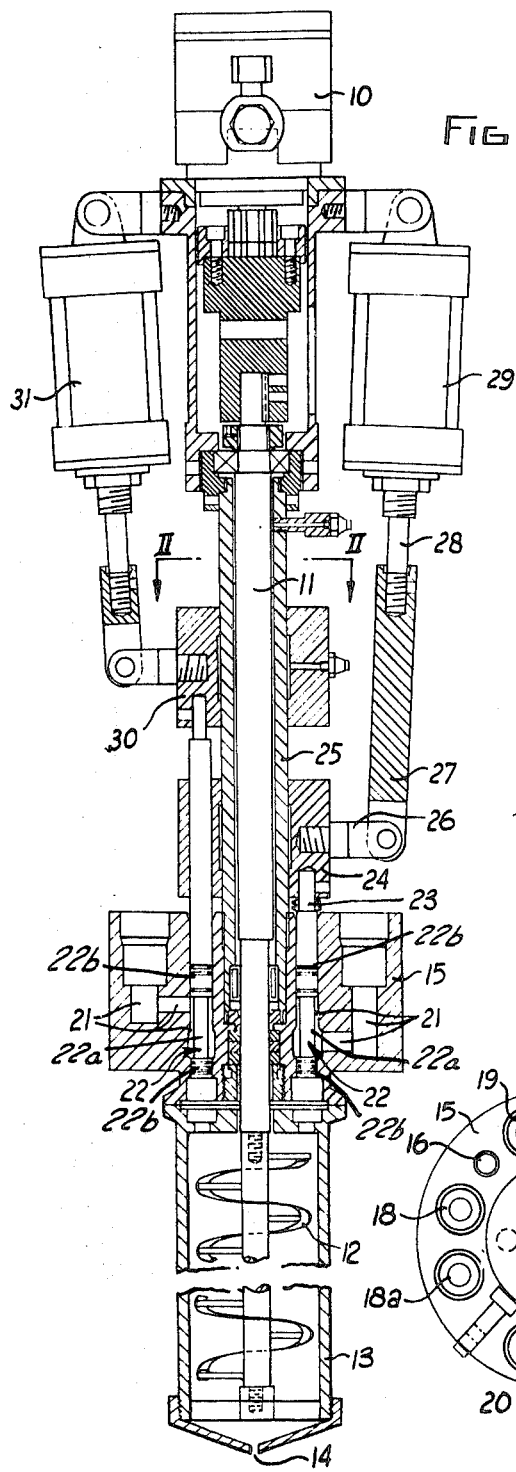

United States Patent

[11] 3,608,870

| | | |
|---|---|---|
| [72] | Inventor | John Brian Aldridge |
| | | Manchester, England |
| [21] | Appl. No. | 811,555 |
| [22] | Filed | Mar. 28, 1969 |
| [45] | Patented | Sept. 28, 1971 |
| [73] | Assignee | Vitafoam Limited |
| [32] | Priority | Mar. 29, 1968 |
| [33] | | Great Britain |
| [31] | | 15093/68 |

[54] FOAMABLE MIXTURE DISPENSING HEAD
6 Claims, 2 Drawing Figs.

[52] U.S. Cl. .................................................... 259/23, 23/252
[51] Int. Cl. .................................................... B01f 7/24, B01f 15/02
[50] Field of Search ........................................... 259/8, 7, 5, 6, 9, 10, 21, 22, 23, 24, 25; 23/252

[56] References Cited
UNITED STATES PATENTS

| | | | |
|---|---|---|---|
| 3,051,455 | 8/1962 | Magester ..................... | 259/8 |
| 3,207,486 | 9/1965 | Rosenthal .................... | 259/8 |
| 3,220,801 | 11/1965 | Rill ............................. | 259/8 |

Primary Examiner—Robert W. Jenkins
Attorney—James E. Nilles

ABSTRACT: A dispensing head for dispensing foam mixtures, the dispensing head including a mixing chamber having an impeller mounted within the mixing chamber, first feed and return lines for simultaneously admitting premixed nonreactive components and reactive components to the mixing chamber, and second feed and return lines for simultaneously admitting a second premixed nonreactive component and the reactive component to said mixing chamber.

PATENTED SEP28 1971

3,608,870

INVENTOR:
J. B. ALDRIDGE
BY:
James E. Nilles
Att'y

FOAMABLE MIXTURE DISPENSING HEAD

This invention concerns a dispensing head for a foamable mixture such as a polyurethane mixture for producing a flexible polyurethane foam.

The object of the present invention is to provide a dispensing head from which a plurality of formulations of components for producing a flexible polyurethane foam can be dispensed.

In a dispensing head of the kind used for dispensing foamable mixtures there is provided a mixing chamber into which components are pumped for final mixing prior to being dispensed for example into a mould. It has been found that, due to the design requirements for such a dispensing head, the number of inlets and outlets for components of the mix must be restricted if the head is to be kept to a workable size and hitherto this restriction has made it possible only to dispense one formulation from the head since all available inlets and outlets are utilized.

Developments in mixing techniques for the components of a mix now forming the subject of the copending application for Letters Patent of Ivor Musgrave filed in the U.S. Patent Office on even date herewith and claiming priority under 35 U.S.C. 119 of British Patent Application 15091/68 filed in Great Britain on Mar. 29, 1968 have resulted in modifications to the dispensing head now being possible and it is thus possible in accordance with the present invention to provide in a dispensing head means for dispensing as desired any one of a plurality of formulations, there being provided in the dispensing head a first feed and return line for a premixed quantity of components in combination with a first feed and return line for a metered quantity of at least one additional component to complete the formulation, together with at least one further combination of feed and return lines for a different premixed quantity of components and a metered quantity of at least one additional component and means for clearing the mixing chamber and dispensing nozzles of residual quantities of components prior to changing from one formulation to another.

Figure 2:
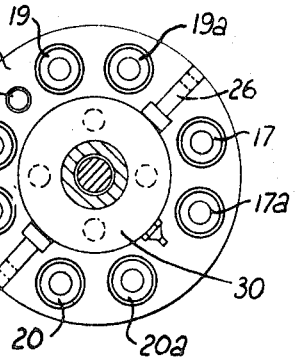

The invention will be described further, by way of example, with reference to the accompanying drawings in which:

FIG. 1 is a longitudinal cross section of a dispensing head made in accordance with the invention; and FIG. 2 is a plan view on the line II—II of FIG. 1.

In the following description a dispensing head for dispensing as desired one of two formulations of polyurethane foam mixture will be referred to but this does not restrict the invention to the dispensing of this number of formulations only.

Basically a dispensing head includes a mixing motor 10 mounted in the upper region of the head and driving, through a drive shaft 11 passing down the head, a mixing impeller 12 located in a mixing chamber 13 at the lower end of the head. The mixing chamber 13 has an outlet 14 from which a mixed quantity of foamable polyurethane is dispensed into, for example a mould. Above the mixing chamber 13 are nine ports (hereinafter referred to) formed in a collar 15 around the drive shaft 11. One of these parts 16 is connected to a solvent cleaning fluid supply (not shown) and the remaining eight are grouped into two groups of four. In one group is a T.D.I. inlet port 17 and return port 17a and an inlet port 18 and return port 18a for a blend of the remaining components. In the other group is a T.D.I. inlet port 19 and return port 19a and an inlet port 20 and return port 20a for a blend of the remaining components. The ports just referred to all communicate with the mixing chamber via their connecting passage ways 21 within which are located spring-loaded valves 22 each having a valve stem 22a and a spring 22b at each end, the arrangement of the valves 22 being such that they close the passage ways 21 to the return ports 17a, 18 a, 19a and 20a when components are to be fed to the mixing chamber 13 and when they are in position to close the inlet ports 17, 18, 19 and 20 to the mixing chamber 13 the outlet ports are in communication therewith so that the T.D.I. and the blend of components can circulate through the feed and return lines to the mixing chamber.

The spring-loaded valves of one group for example the valves 17, 17a, 18, 18a are connected by plungers 23 to a first sleeve 24 slidably mounted on a tube 25 through which the drive shaft 11 for the mixer 12 passes and this sleeve 24 is connected via a link 26 and lever 27 to the ram 28 of a pneumatic (or hydraulic) cylinder 29 operated by a hand-controlled switch (not shown) on the mixing head The spring-loaded valves of the other group are similarly connected to a sleeve 30 and pneumatic (or hydraulic) cylinder 31 operated by a further switch.

In use it is only necessary to operate one or other of the hand-controlled switches to determine the source from which the blend and the T.D.I. arrive at the mixing chamber 13 and thus since two complete sets of ports are provided and are supplied independently from separate sources two grades of product can be produced as desired without any need for stoppage of the plant while new formulations are prepared.

From time to time the mixing chamber 13 and outlet ports are flushed with a solvent cleaner from the supply referred to above as is normal practice.

While reference has been made to the use of pneumatic or hydraulic means for controlling the valves it is possible to use electric or electronic control means for such valves.

I claim:

1. A dispensing head for dispensing any one of a plurality of formulations of foamable mixtures, said dispensing head including a mixing chamber, an impeller located in said mixing chamber, means for driving said impeller to mix components fed thereto, a first feed and return line for premixed nonreactive components operatively connected to said mixing chamber, a first feed and return line for a reactive component operatively connected to said mixing chamber, means for simultaneously connecting said first feed and return lines for said nonreactive and reactive components to said mixing chamber for completing the selected formulation; a second feed and return line for a second premixed nonreactive component and a second feed and return line for said reactive component and means for simultaneously connecting said second feed and return lines for said reactive components and said nonreactive components to said mixing chamber.

2. A dispensing head as claimed in claim 1 in which the feed and return lines are connected to the mixing chamber by ports and passages, including valves in said feed and return lines, and means for sequentially controlling said valves to enable feeding and returning of components to said mixing chamber.

3. A dispensing head as claimed in claim 2 in which the valves are spring loaded and are connected to a control means slidable on the head and operable by pneumatic or hydraulic means.

4. A dispensing head as claimed in claim 3 including a first control means on the head operatively connected to control the valves for the first feed and return lines and a second control means on the head to control the valves for the second feed and return lines.

5. A dispensing head as claimed in claim 2 in which the valves are electrically or electronically controlled.

6. A dispensing head as claimed in in claim 1 in which at least one additional feed and return line for a solvent is provided on the head and is connected to the mixing chamber whereby the solvent may be fed to the mixing chamber to purge the mixing chamber prior to transfer of feed and return of components from one set of ports to another.